Figure 1:
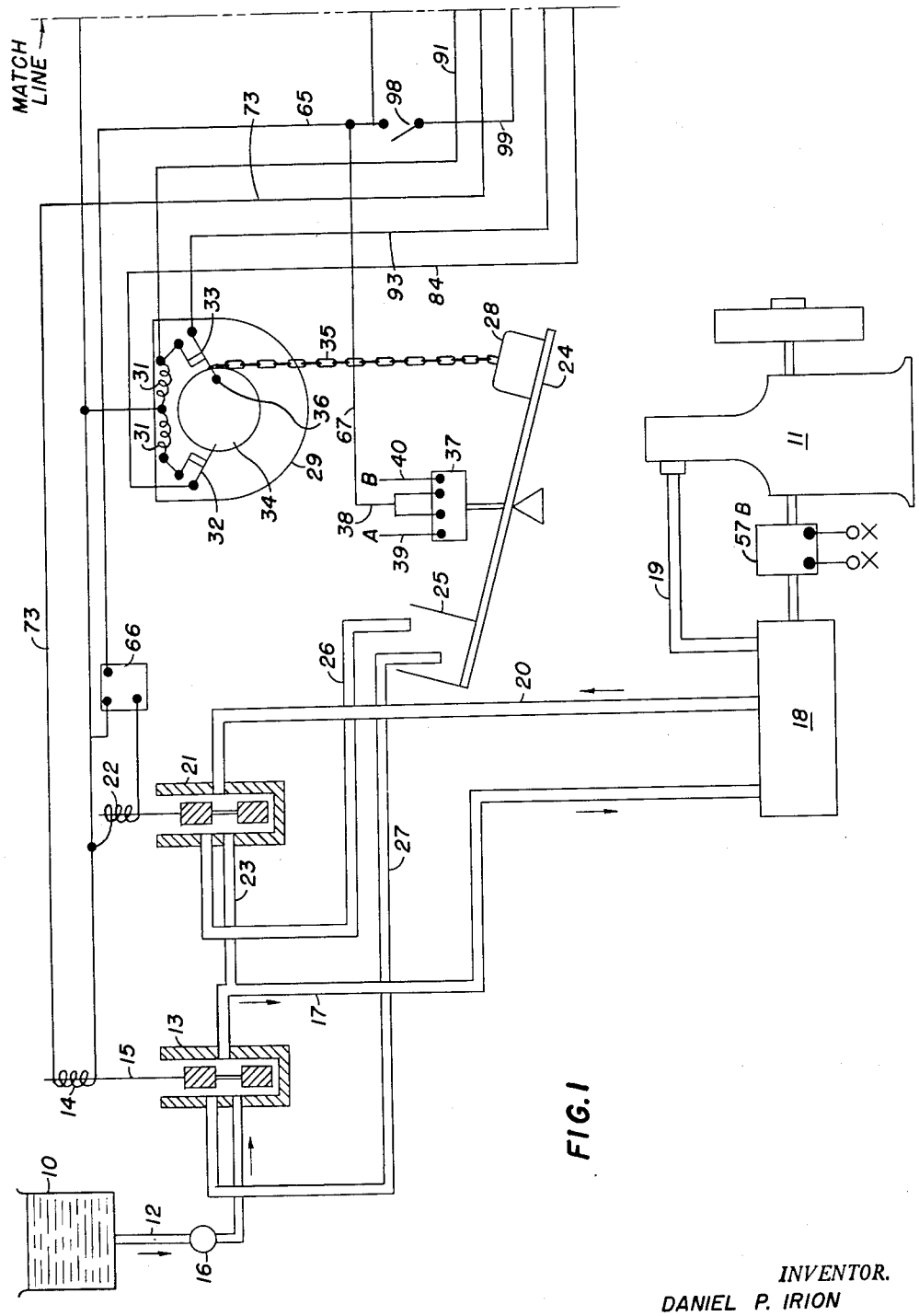

April 17, 1956     D. P. IRION     2,741,914

AUTOMATIC FUEL WEIGHING DEVICE

Filed Dec. 28, 1953     2 Sheets-Sheet 1

INVENTOR.
DANIEL P. IRION

BY Edward H Lang

ATTORNEY.

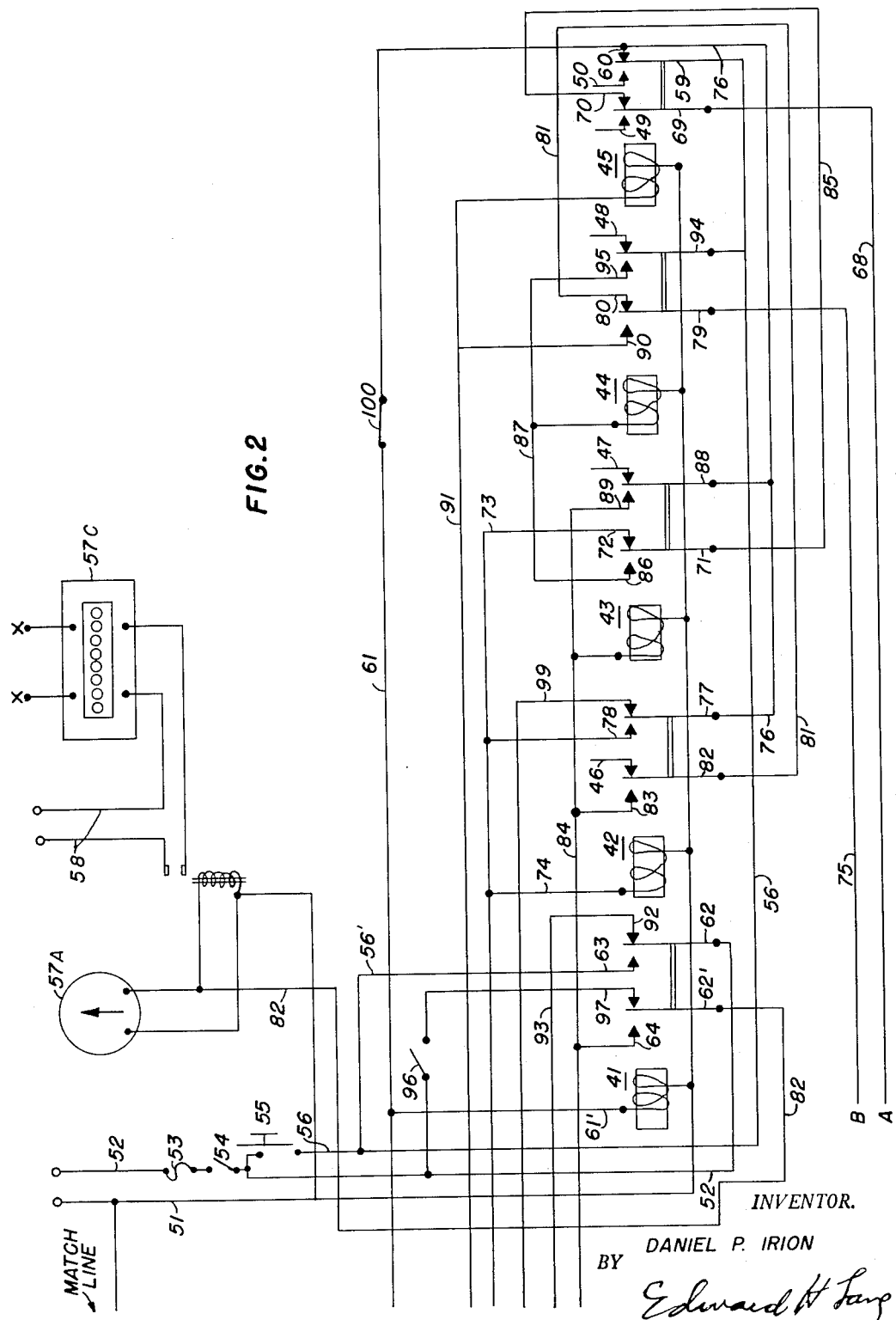

United States Patent Office 2,741,914
Patented Apr. 17, 1956

2,741,914

AUTOMATIC FUEL WEIGHING DEVICE

Daniel P. Irion, Algonquin, Ill., assignor to The Pure Oil Company, Chicago, Ill., a corporation of Ohio Application December 28, 1953, Serial No. 400,682

3 Claims. (Cl. 73—113)

This invention relates to a device which measures the mass flow of a liquid. It is more concerned with the control component of the device which controls the volumetric flow and mass rate measurements.

The susceptibility of liquid fuels employed in various types of prime movers to volume changes due to temperature variations, as well as the differences in the densities of different types of fuels, make volume measurements undesirable when an accurate determination of fuel consumption is necessary. Such measurements are necessary for use in facilities used for testing various types of engines. Accordingly, it has been found that instruments which permit the flow of fuel to be measured in units of mass are more satisfactory. These devices are more flexible in their operation because of their ability to handle a wide variety of liquid fuels of different densities. There are a number of apparatus described in the prior art which accurately, automatically, and rapidly check the fuel consumption of various types of fuel consuming engines under test conditions. One of the most efficient apparatus which is employed in this work is the fuel metering apparatus described by Ellison in U. S. Patent No. 2,571,695. This device consists essentially of four component sections, namely, a fuel supply and metering section, a load or delivery point, a power supply and recording section, and a control section containing a plurality of relays. In spite of the nicety of design of the fuel weighing device described in U. S. Patent No. 2,571,695, it is difficult to stop the entire operation if something goes wrong with the engine or test apparatus to which the fuel is being fed; the device is difficult to adjust and will not automatically reset itself after power failure. In addition, out of phase oscillation or bouncing of the beam balance employed in the supply and metering section can occur. When this occurs, the normal cycle of operation is disrupted and the device gets out of sequence.

Accordingly, it is the principal object of this invention to provide a control section, which, through the interaction of a plurality of relays, will cooperate with a fuel supply and metering section, a load or delivery point, and a power supply recording section to provide an improved automatic device for accurately metering the mass rate of flow of liquids. This and other objects will become more apparent from the following detailed description of the instant invention.

Figures 1 and 2 constitute a schematic representation of the complete apparatus showing the various component sections integrated into a unit for automatically measuring liquid flow by weight.

In an apparatus of this nature, when it is being employed as a fuel weighing device, there is a sequence of operations which make up a complete cycle. Initially, a specific amount of liquid fuel is caused to flow from a suitable device and is supplied to a receiving vessel. The flow of fuel from the main source is stopped and the specific amount of fuel is transferred from the receiving vessel to the engine where it is consumed. This flow is interrupted after a definite amount has been consumed and the time required for consumption is noted. At this point, the mass flow rate of fuel consumption can be accurately, automatically and rapidly determined. The engine may continue to operate on fuel which is now pumped to the engine directly from the main source of supply thus completing the cycle. Reference to Figure 1 will show that this sequence can be efficiently carried out by means of an apparatus which consists of a fuel source 10 which is connected to a fuel consuming engine 11 by means of conduit 12 which transfers the fuel to drain valve 13. Drain valve 13 is a 3-way type of spool valve actuated by solenoid 14 by means of plunger rod 15 which is connected to the spool element of valve 13. Conduit 12 has positioned therein a suitable flow controller 16 for regulating the discharge of fuel from source 10. When the fuel metering device is not operating, the spool element of valve 13 is in a position which permits the flow of fuel through valve 13 to conduit 17 where it passes to a fuel injection system 18. Sufficient fuel is pumped into engine 11 through conduit 19 to permit its continuous operation. The remainder of the fuel entering fuel injection system 18 is then by-passed through conduit 20. This portion of fuel flows through conduit 20 to filler valve 21, which like valve 13 is a 3-way, spool type of valve actuated by solenoid 22. When the fuel metering device is not functioning in its intended use, the fuel flows through valve 21 and conduit 23 to a point of confluence with conduit 17. Thus this recycling portion of fluid is admixed with fuel flowing in conduit 17 and returned to injection system 18 for use in engine 11, or continues to be recycled through by-pass 20. Forming a part of the fuel supply and metering section is beam balance 24 which in the non-operative position is tilted as shown in the drawing. One side of the balance is fitted with a suitable fuel receiver 25 which serves to hold the definite amount of fuel consumed during the fuel consumption phase of engine testing. To permit beam balance 24 to assume the tilted position shown in spite of receiver 25 resting on the balance, the balance is suitably counterweighted. Entering into receiver 25 is conduit 26 which, through the cooperation of filler valve 21, transfers that portion of the fuel which is recycling to receiver 25, and line 27 which permits the delivery of fuel from receiver 25 to drain valve 13 and thence to engine 11 through conduit 19 when the device is operating. Cooperating with the beam balance 24 is weight 28 which serves to control the specific amount of fuel transferred to the receiving vessel 25 and consumed during the fuel testing of the engine 11. This control is effected by positioning weight 28 on beam balance 24, or removing it therefrom in response to signals received from the relay operated control section of the apparatus. The lowering and raising of the weight 28 is brought about by means of motor 29 which is operated in response to the above mentioned signals. This motor 29, in the embodiment shown in Figure 1, has a single armature common to two (2) separate sets of field coils 30 and 31, each controlling a direction of rotation of the armature shaft. Each coil which is shown schematically on the drawing is connected to a limit switch 32 and 33 which controls the amount of rotation of the motor 29, and thus the amount of travel of weight 28 which is affixed indirectly to the periphery of disc 34 rotated by motor 29 by means of a flexible connector such as chain 35. Mounted on the face of disc 34 is pin 36 which opens the limit switch contacted thereby and stops the rotation of the motor 29. A solenoid whose action is suitably dampened by means of a conventional dashpot arrangement may be substituted for motor 29 and interconnected in the circuit in the manner described in U. S. Patent 2,571,695. Attached to and operated by beam balance 24 is mercury switch 37 having a common terminal 38 and two (2) end terminals 39 and 40. The terminals of the mercury switch are electrically connected to the relay-operated control section. This mercury switch may be of any suitable design; it is preferred, however, that magnetically operated mercury switches mounted near the beam balance 24 be employed. In this type of switch, a small magnet mounted on an arm of the balance actuates small vanes in the switches. This eliminates any electrical connections between the moving beam balance and the electrical circuit to which the mercury switch is connected as is necessary in the mercury switch 37 schematically shown in the drawing. Although the magnet imposes a very slight drag on the movement of the beam balance 24, the timing is always done in the same direction and any error which might occur will be cancelled. The relay operated control section which functions as the brain of the apparatus consist of five (5) relays, 41, 42, 43, 44, and 45 which initiate, control and terminate the sequence of operation performed by the apparatus during its functioning as the means for measuring fuel consumption in cooperation with the other elements of the combination. For convenience and economy obtained by avoiding the use of specifically designed relays, all of these relays may be, as shown in the drawing, double pole, double throw relays with the contacts in a normally closed position which is the position assumed by the contacts when the operating mechanism is de-energized as shown in the drawing. If all double pole, double throw relays are used, there are several poles which are not connected in the circuit. In the embodiment shown in Figure 2, the non-operative connections are designated as poles 46, 47, 48, 49, and 50. The coils of these relays are energized generally by means of a standard 60 cycle, 110-120 volt power supply which is supplied to the apparatus through electrical connections 51 and 52. As a safety feature, fuse 53 is serially connected in the power line 52. This line has also disposed therein a main switch 54 and a pushbutton type of switch 55 which controls the flow of current through that part of the relay circuit connected to line 56. The pushbutton is generally a remote control device located on the panel of the test apparatus for convenience. Additional accessories which make up the power supply and recording section is the revolution counting and recording mechanism which consists of the timer 57A transmitter 57B, which is directly connected to engine 11 and counter 57C which makes manifest the number of revolutions which the engine has turned during the fuel testing cycle. The transmitter 57B and counter 57C, elements of the counting mechanism, are electrically connected through points X—X located on each element of the counting mechanism. Power to operate the revolution counting mechanism may be supplied from a separate D. C. power source through lines 58 as shown, or may be provided through the main source of supply after proper rectification.

The cooperation between the several component parts of the apparatus will be better understood by describing in detail the operation of the network elements during a complete cycle of operation.

In the idle position, as it has been pointed out, weight 28 on the beam balance 24 and the beam balance is tilted as shown. The fuel receiver 25 is in an up position. After the main switch 54 has been closed to initiate the sequence of steps which results in the determination of the mass flow rate, pushbutton 55 is operatively connected between lines 52 and 56. To expedite the initiation of the cycle, it is preferred that pushbutton 55 be spring-loaded to permit its return to a normally off position, once the forces employed to close this switch have been removed. During the instant that pushbutton 55 completes the circuit between lines 52 and 56, current flows in line 56 through the normally closed contact 59 and pole 60 on relay 45 and back to the coil on relay 41 through lines 61 and 61'. Relay 41 being energized causes contacts 62 and 62' to engage poles 63 and 64 respectively, thus "shorting out" the pushbutton 55. This permits the pushbutton 55 to be disconnected from the circuit without de-energizing relay 41 because of the current flow from line 52 across contact 62 and pole 63, and through line 56' back to line 56. A portion of the current flowing in line 61 continues through line 65 and energizes solenoid 22 either directly or by means of time delay relay 66, opening filler valve 21. In this energized position, filler valve 21 diverts the flow of fuel from conduit 23 to conduit 26, the terminal end of which is disposed within fuel receiver 25. Receiver 25 now slowly fills with fuel until the weight of fuel discharged into the receiver is sufficient to over-balance the weight 28. This over-balancing causes the beam balance 24 to tilt the other way lowering receiver 25.

Mercury switch 37 now interrupts the continuity between terminals 38 and 40 of the mercury switch which heretofore were in an open circuit, and makes connection between mercury switch terminals 38 and 39. A portion of the current from line 65 passes through line 67 across terminals 38 and 39 to line 68 which is connected to terminal 39 at point A as indicated. The current flows through the normally closed contact 69 and pole 70 of relay 45 and normally closed contact 71 and pole 72 of relay 43 by way of line 73 to solenoid 14, and through the coil of relay 42 via line 74, thus energizing relay 42. With solenoid 14 being energized, the position of the spool element of drain valve 13 is shifted, changing the path of the fuel flow so that the fuel is now fed to the injector system 18 from the receiver 25 through conduit 27 and drain valve 13 to conduit 17.

In this phase of the cycle, the engine 11 is consuming fuel being delivered solely from the receiver 25, but does not deplete this fuel supply entirely at this time. The loss of weight from the receiver side of the balance, due to the fuel being consumed from the receiver 25, results in an over-balancing of the beam balance 24 by weight 28. This tilts the balance and the mercury switch again disconnecting terminals 38 and 39, and completnig the circuit from line 67 to line 75 through mercury switch terminals 38 and 40. Electrical connection between line 75 and terminal 40 is made through point B as indicated. Relay 42 having been energized, as above described, remains energized because the flow of current to line 73 is now from line 56 through contact 59 and pole 60 of relay 45 to line 76 and contact 77 and pole 78 of relay 42. This permits current to flow in line 75 through the normally closed contact 79 and pole 80 of relay 44 via line 81 to contact 82 and pole 83 of relay 42. Because relay 42 is energized, contact 82 engages pole 83 of relay 42. Pole 83 is connected to line 84. The resultant flow of current in line 84 is multifunctional in effect: (1) it energizes the coil of relay 43, (2) it starts the timer 57 by passing through pole 64 and contact 62 of relay 41 to line 82 and thence to the timer, (3) it energizes the electrical relay in line 82, which is the operation of the revolution counting mechanism, (4) it flows through line 84 to the limit switch 32 of the motor 29, thus raising the weight. These four effects are, of course, carried out simultaneously. As the weight 28 is removed, the balance under the weight of the receiver 25 and the fuel remaining therein tilts and the receiver side of the balance 24 descends.

The balance 24 having tilted down on the receiver side, the continuity between terminals 38 and 40 of mercury switch 37 is disrupted and contact is made between mercury switch terminals 38 and 39. As a result the current flows from line 67 across terminals 38 and 39 by way of line 68 to contact 69 and pole 70 of relay 45. It continues through line 85 to contact 71 which now engages pole 86 due to the fact that relay 43 has been energized as just described. This permits the current to pass to line 87 which interconnects pole 86 and the coil of relay 44 energizing relay 44. This is the only change occurring in the circuit elements at this instant. The engine continues to operate on the fuel being supplied from receiver 25, the clock 57 continues to run, the revolution counting mechanism continues to operate, relays 41, 42, 43, and 44 remain energized. As the fuel supply in receiver 25 becomes depleted by the engine, weight is removed from the receiver side of the balance 24 and the over-balancing originally provided in the balance 24 results in the lowering of the weight side of the balance, even though the weight 28 is not resting on the balance.

The tilting of the balance 24 again causes the mercury switch 37 to operate disconnecting terminals 38 and 39, and connecting terminals 38 and 40. The current flows from line 67 across terminals 38 and 40 continuing through line 75 to contact 79 of relay 44. Relay 44 being energized results in the joining of contact 79 and pole 90. This produces a flow of current in line 91. Line 91 being connected to the coil of relay 45 energizes this relay. This causes contacts 59 and 69 to engage with poles 50 and 49, respectively, producing a discontinuity not only in the circuit from the mercury switch terminals 39, but also in lines 60, 65, and 67 as well as in the circuits which energize the coils of relays 41, 42, 43, and 44. As a result, these relays become de-energized and the clock stops. In additions, the two solenoids 14 and 22 operating the filler valve 21 and drain valve 13 become de-energized and these valves close. With relay 41 being de-energized, the normally closed contact 62 re-engages pole 92. Current flows from line 52 through contact 62 and pole 92 to motor 29 by means of line 93 and limit switch 33. While motor 29 is lowering the weight 28, limit switch 33 is closed. A portion of current which passes through the limit switch is sent through line 91 and is employed to keep the coil of relay 45 energized until the weight 28 is resting on the weight side of the balance 24. When pin 36 opens limit switch 33, the circuit to relay 45 is disrupted, de-energizing relay 45. The contacts on relay 45 return to their normal positions. The run cycle is thus completed and the apparatus reset to start again when the pushbutton 55 is again pressed.

The manual timer switch 96 permits the use of the timer for other purposes when the apparatus is not operating and fuel is not being weighed. This switch would connect line 82 to power source 52 through normally closed contact 62' and pole 97 of relay 41.

An arrangement is also provided which will permit the determination of mass flow rate of fuel being consumed in an engine which does not have a by-pass injector such as is shown in the embodiment illustrated in Figure 1. In this instant, all of the fuel entering into the fuel feeding system is consumed by the engine. To operate under these conditions, switch 98 which is serially connected in line 99, is provided. This switch when closed connects line 99 to line 65 which will permit filler valve 21 to operate in its functional capacity. When this type of operation is being carried out switch 100 in line 60, which is normally closed when a by-pass injector is used, is opened to permit the current flowing through line 99 to exclusively operate the filler valve. Thus valve 21 will remain open until the receiver 25 has been filled with fuel and then close, discontinuing the flow of any additional amounts of fuel to the receiver for the remainder of the run.

From the foregoing description, it is seen that the relay operated control section of this invention enhances the effectiveness of the fuel weighing device described in U. S. Patent 2,571,695 and permits the accurate, automatic, and rapid measurement of liquid flow by weight. Although the foregoing discussion is directed to the use of the subject apparatus as a means for measuring the fuel consumption of engines undergoing laboratory dynamometer test, it can also be readily adapted to the testing of pumps as well as the filling of containers with measured amounts of liquids. These and other uses of the instant invention, as well as the necessary modifications in the apparatus are considered to be within the scope of this invention.

What is claimed is:

1. In a fuel metering device of the character described for automatically measuring fluid flow by weight, in combination with a main source of fuel supply, a fuel consuming prime mover, a conduit system interconnecting said source of fuel supply in said prime mover, an electrically operated filler valve, and an electrically operated drain valve disposed in said conduit system to control the flow of fuel therethrough, an injection means for introducing fuel into said prime mover also disposed in said conduit system, a secondary source of fuel supply comprising a weighing scale, a double throw electrical switch means having a first and second poles switch operated by the oscillations of said weighing scale, to control the current flow in the hereinafter mentioned control section, a receiving vessel for holding a secondary source of fuel supply supported on said weighing scale, a reciprocating weight cooperating with said scale, and an electrically operated means for effecting the reciprocation of said weight, an electrical source of power supplying current to an electrical network contained in said device, and an electrically operated recording section, a control section which comprises a plurality of electromagnetically operated relays, each of said devices containing an electrically energized coil which operates an electrical switch means, the first of said relays having two normally closed contacts, a second relay having a normally closed contact and a double throw contact, a third relay having one double pole contact, a fourth relay having one normally open contact and one double throw contact, and a fifth relay having a normally open contact and a double throw contact, circuit means connecting one of the normally closed contacts of the first relay cooperating with the double throw contact of the second relay to open said drain valve, the other normally closed contact of the first relay cooperating with the double pole contact of the fourth relay to open said filler valve and energize the coil of the fifth relay, said double pole contact of the fourth relay also functioning to close said filler valve, circuit means connecting the double throw contact of the third relay cooperating with the normally open contact of the fourth relay to energize the coil of the second relay, to initiate the flow of current to said means for reciprocating thereby effecting the raising of said weight, and further cooperating with the normally open contact of the fifth relay and the normally open contact of the fourth relay to initiate the flow of current to said recording section, the coil of the third relay being energized by said one of the normally closed contacts of the first relay cooperating with the double throw contact of said second relay to initiate the flow of current through the coil of the third relay, the coil of the first relay being energized by the double throw contact of said third relay initiating the flow of current through the coil of the first relay, whereby the coils of the second, third, fourth, and fifth relays are de-energized and current flow is initiated through the double throw contact to the said means for reciprocation thereby causing said weight to be lowered.

2. In a fuel metering device of the character described for automatically measuring fluid flow by weight, in combination with a main source of fuel supply, a fuel consuming prime mover, a conduit system interconnecting said source of fuel supply in said prime mover, an electrically operated filler valve, and an electrically operated drain valve disposed in said conduit system to control the flow of fuel therethrough, an injection means for introducing fuel into said prime mover also disposed in said conduit system, a bypass conduit connected with said fuel injection means and said conduit system, a secondary source of fuel supply comprising a weighing scale, a double throw electrical switch means having a first and second poles switch operated by the oscillation of said weighing scale to control the current flow in the hereinafter mentioned control section, a receiving vessel for holding a secondary source of fuel supply supported on said weighing scale, a reciprocating weight cooperating with said scale, and an electrically operated means for effecting the reciprocation of said weight, an electrical source of power supplying current to an electrical network contained in said device, and an electrically operated recording section, a control section which comprises a plurality of electromagnetically operated relays, each of said devices containing an electrically energized coil which operates an electrical switch means, the first of said relays having two normally closed contacts, a second relay having a normally closed contact and a double throw contact, a third relay having one double pole contact, a fourth relay having two normally open contacts, a fifth relay means having one normally open contact and one double throw contact; circuit means connecting one of the normally open contacts of the first relay controlling the flow of current to open said filler valve, and energize the coil of the fifth relay, circuit means connecting the other of the normally closed contacts of the first relay in cooperation with the first pole of said double pole switch controlling the flow of current through the double pole contact of the second relay to energize the coil of the fourth relay, to initiate the flow of current to open said drain valve, circuit means connecting the double throw contact of the third relay in cooperation with the second pole of said double pole switch initiating the flow of current through the double throw contact of the fourth relay to energize the coil of the second relay, to initiate the flow of current to the means for reciprocation thereby effecting the raising of said weight, and further causing current to flow through the double pole contact of the fifth relay to said recording section, the double throw contact of the second relay also functioning to initiate the flow of current from the first pole of said double pole switch in cooperation with said one of the normally closed contacts of first relay, to energize the coil of the fourth relay, circuit means connecting the double throw contact of the third relay initiating the current flow from the second pole of said double pole switch to energize the coil of the first relay, whereby the coils of the second, third, fourth, and fifth relays are de-energized, circuit means connecting the double throw contact of the fifth relay initiating the flow of current to the means for reciprocation thereby effecting the lowering of said weight, and controlling the flow of current to the coil of the first relay to maintain it energized after the double throw contact of the third relay loses control of the flow of current and until the weight is resting on the weighing scale.

3. An apparatus in accordance with claim 2 in which the means for reciprocation is a reversible motor having separate field coils to control the direction of rotation of a common armature.

References Cited in the file of this patent
UNITED STATES PATENTS

| | | |
|---|---|---|
| 2,409,982 | Longmate | Oct. 22, 1946 |
| 2,571,695 | Ellison | Oct. 16, 1951 |
| 2,672,754 | Kent | Mar. 23, 1954 |